United States Patent
Dance et al.

(10) Patent No.: US 6,741,745 B2
(45) Date of Patent: May 25, 2004

(54) METHOD AND APPARATUS FOR FORMATTING OCR TEXT

(75) Inventors: Christopher R. Dance, Trumpington (GB); Mauritius Seeger, Fowlmere (GB)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/738,320

(22) Filed: Dec. 18, 2000

(65) Prior Publication Data

US 2002/0076111 A1 Jun. 20, 2002

(51) Int. Cl.[7] ............................................. G06K 9/72
(52) U.S. Cl. ............................ 382/229; 382/209
(58) Field of Search .............................. 382/181, 190, 382/209, 218, 225, 229, 309, 311, 321; 715/529, 542

(56) References Cited

U.S. PATENT DOCUMENTS

| | | | |
|---|---|---|---|
| 4,887,301 A | 12/1989 | Hodgens et al. | 382/178 |
| 5,185,818 A | 2/1993 | Warnock | 382/112 |
| 5,253,307 A | 10/1993 | Wayner et al. | 382/181 |
| 5,438,657 A | 8/1995 | Nakatani | 715/506 |
| 5,513,277 A | 4/1996 | Huttenlocher | 382/171 |
| 5,623,681 A | 4/1997 | Rivette et al. | 715/522 |
| 5,625,711 A | 4/1997 | Nicholson et al. | 382/224 |
| 5,668,891 A | 9/1997 | Fan et al. | 382/168 |
| 5,689,585 A | 11/1997 | Bloomberg et al. | 382/229 |
| 5,729,637 A | 3/1998 | Nicholson et al. | 382/282 |
| 5,754,873 A | 5/1998 | Nolan | 715/527 |
| 5,778,403 A | 7/1998 | Bangs | 715/527 |
| 5,860,074 A | 1/1999 | Rowe et al. | 715/526 |
| 5,883,974 A | 3/1999 | Fan et al. | 382/203 |
| 5,889,897 A | 3/1999 | Medina | 382/310 |
| 5,953,453 A | 9/1999 | Fan et al. | 382/200 |
| 6,385,350 B1 * | 5/2002 | Nicholson et al. | 382/309 |

* cited by examiner

Primary Examiner—Daniel Mariam

(57) ABSTRACT

Following scanning of a document image, and optical character recognition (OCR) processing, the outputted OCR text is processed to determine a text format (typeface and font size) to match the OCR text to the originally scanned image. The text format is identified by matching word sizes rather than individual character sizes. In particular, for each word and for each of a plurality of candidate typefaces, a scaling factor is calculated to match a typeface rendering of the word to the width of the word in the originally scanned image. After all of the scaling factors have been calculated, a cluster analysis is performed to identify close clusters of scaling factors for a typeface, indicative of a good typeface fit at a constant scaling factor (font size).

20 Claims, 4 Drawing Sheets

METHOD AND APPARATUS FOR FORMATTING OCR TEXT

BACKGROUND OF THE INVENTION

1. Field of the Invention

The present invention relates to formatting text obtained by optical character recognition (OCR) from a scanned image. Such text is referred to herein as OCR text. More specifically, the invention relates to selection of a typeface and/or font for the display of OCR text. One application of the invention is to facilitate the selection of text from displayed OCR text.

2. Description of Related Art

When generating OCR text from an image, or when copying a section of OCR text, it is often desirable to maintain the original typeface and font size of the original document, to produce an OCR version of the document having the same text format.

There are many known techniques for analyzing OCR text to establish a typeface and font size, and also for copying formatted text into a computer application program (such as a word processing program). Examples of known techniques are described in the following U.S. Pat. Nos. 5,860,074; 5,185,818; 5,889,897; 5,623,681; 5,729,637; 5,625,711; 5,689,585; 5,754,873; 5,778,403; 5,438,657; 4,887,301; 5,953,453; 5,883,974; 5,668,891; 5,513,277; and 5,253,307.

The known techniques for determining the type and font size of OCR text generally rely on an analysis of individual characters (e.g., character width or thickness) to obtain a best fitting typeface and font size for the character. However, such a technique is particularly prone to errors caused by noise in the image, which might make the individual characters difficult to characterize in terms of a typeface and a font size.

SUMMARY OF THE INVENTION

It would be advantageous to provide an alternative technique which can be easier to implement and which is not limited to character-by-character analysis.

Broadly speaking, one aspect of the present invention is to determine a typeface setting and/or a font size setting for OCR text based on matching a word size instead of an individual character size as in the prior art.

Using a word size instead of an individual character can provide the following advantages:

a) Reduced processing time (as the number of words is less than the number of characters);

b) In order to match character widths, it is necessary to define exactly which part of an image corresponds to a particular character, i.e. to segment a word into individual characters. For poor quality binary images, there may be multiple candidate segmentations of an image of a word into its component characters. In contrast, it is much easier to segment an image into separate words with less ambiguity.

c) Image heights and widths are based on the number of pixels. The fractional accuracy of measuring the width of a character in an image is on average much worse than the fractional accuracy of measuring the width of a word in an image.

d) Typefaces are characterized not only by the shapes and sizes of characters but also by character spacing. Matching on the basis of character widths does not take this into account, and so loses this important information. In contrast, matching on the basis of word lengths inherently takes into account the spacing of adjacent characters in the word.

In one form, the invention provides a technique comprising:

(a) calculating for each word and for each of a plurality of possible typefaces (also referred to herein as candidate typefaces) a scaling factor to match a typeface rendering of the word to the size (e.g., width) of the word in the scanned image; and (b) analyzing the variation of the calculated scaling factors for a typeface to identify whether the typeface is a good fit to a plurality of the words.

The term "typeface rendering" means a rendering of the word when the typeface is applied thereto.

The above technique relies on the principle that it is possible to match any typeface to any word width (and height) by the use of suitable scaling factors (equivalent to a font size). However, by analyzing the scaling factors required to fit the typeface to a plurality of words, it is possible to establish whether the typeface is in reality a good match to the original typeface in the originally scanned image. If the scaling factor remains relatively constant, then the typeface is a good match. However, if the scaling factor varies considerably from word to word, then this indicates that the typeface is not a good match.

Preferably, the calculated scaling factors are analyzed by identifying one or more clusters of the scaling factors indicative of the typeface being a good fit to a plurality of the words.

Preferably, a plausible size range is used to determine the size of the word in the scanned image. Preferably, the size range is defined by a plausible minimum size and a plausible maximum size. This can take into account that, due to poor image quality or image noise, it may be difficult to determine the precise size (in pixels) of the word in the image. Nevertheless, it will be appreciated that applying such a range to a word is far more accurate than having to identify the size of an individual character (letter) in conventional techniques.

Preferably, the invention is used in combination with a word-to-word selection tool for enabling a user to select a section of text in a pseudo-image of a document in which a text portion of the document image is replaced by an OCR processed and typeface rendered image of the words of the text.

BRIEF DESCRIPTION OF THE DRAWINGS

Non-limiting embodiments of the invention are now described, by way of example only, with reference to the accompanying drawings in which.

DETAILED DESCRIPTION

Figure 1:
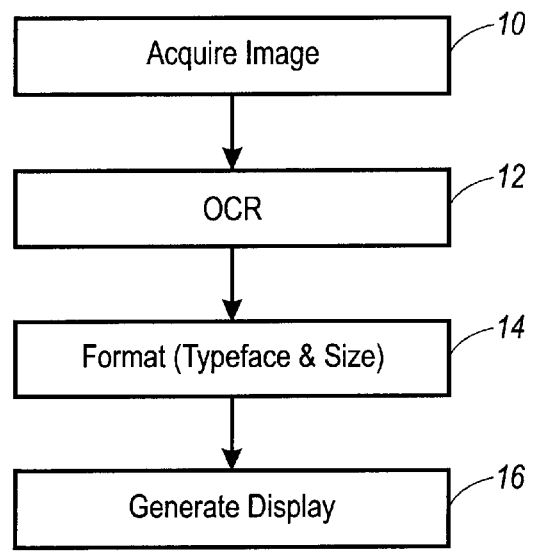
FIG. 1 is a schematic representation of a process for generating OCR text from a scanned document image.

FIG. 1 shows the functional steps of a simplified embodiment for displaying OCR text from a scanned document image, to illustrate the principles of this invention. A second more elaborate embodiment using a selection tool is described later with reference to FIG. 8.

Referring to FIG. 1, the process comprises a first step 10, at which an image of a document is acquired. The image may be obtained from any suitable scanner or document camera which generates a digitized pixel image. At step 12, the digitized image is processed using an OCR algorithm to identify individual characters according to their shape and pattern. Many suitable OCR algorithms are known to one skilled in the art, and need not be described further here.

At step 14, a text format identification is carried out to identify the typeface and font size of the original text in the scanned image, so that the OCR text can be formatted to match the original. The text format identification is described in more detail below.

At step 16, the OCR text is rendered (e.g., displayed) using the identified typeface and font size, to provide the closest resemblance to the original text.

Referring to FIGS. 2–7, the text format identification (step 14) is now described for identifying the typeface and font size of the original text.

One of the principles of this embodiment is to identify a typeface and a font size by comparing the "sizes" of words in the scanned image, to the "sizes" of the corresponding OCR words (i.e., after OCR) when rendered with a plurality of different possible typefaces (referred to as candidate typefaces). In this embodiment, the "size" of the word is represented by a rectangular bounding box around the word.

For each word in a defined section of text (e.g., a paragraph), the scaling factor required to "fit" each typeface to the size of the word in the originally scanned image is calculated. When this is repeated for all of the words in a section of text, the result is a plurality of statistical clusters of scaling factors for the different words and typefaces. The tightest clusters indicate a good typeface fit, whereas spread clusters indicate a poor typeface fit.

In this embodiment, account is also taken of a confidence factor in determining the "size" of a word in the original scanned image. Due to noise in the scanned image, it will typically be impossible to identify precisely the size of a bounding box around the word. Instead, maximum and minimum plausible sizes are determined within which the actual size of the word exists. This means that each calculated scaling factor above is in fact a range of possible scaling factors which fit the typeface within the maximum and minimum sizes of the word in the original image.

Figure 2:
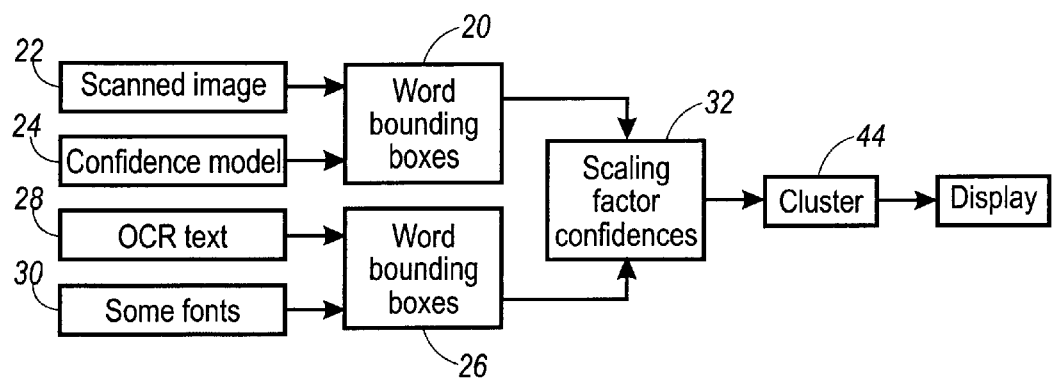
FIG. 2 is a schematic flow diagram showing the principles of typeface/font size determination.

In more detail, in the process of FIG. 2, at step 20, each word in the defined section of text in the original scanned image 22 is processed to identify the size of the word, represented by the size of a bounding box around the word. In order to avoid the difficulties of determining the word size precisely, a confidence model 24 is applied to determine the maximum plausible height and width of the word (within which all of the plausible pixels lie) and the maximum plausible height and width of the word (within which the statistical majority of plausible pixels lie).

Figure 3:
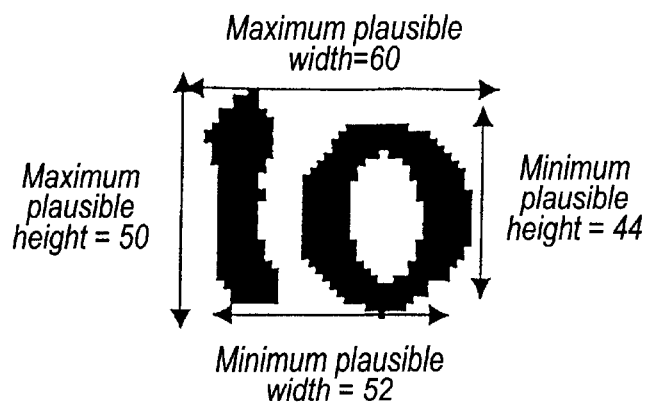
FIG. 3 is a schematic representation of a scanned word.

FIG. 3 illustrates an example of the word "to" in a scanned image. The outlines of the letters forming the word are slightly noisy, meaning that it is difficult to identify the height and width of the word precisely (although it will be appreciated that the problems are far less than those to identify each individual letter size, as in prior art techniques). Instead, it can be said that, to a high degree of "confidence", the maximum plausible width is 60 pixels, and the minimum plausible width is 52 pixels. The maximum plausible height is 50 pixels, and the minimum plausible height is 44 pixels. In other words, the word's width-x-height lies somewhere in the ranges [52, 60]×[44, 50].

At step 26, the corresponding word is processed in the OCR text 28 by applying a plurality of candidate typefaces 30, and calculating the basic size of the word for each candidate typeface. Such a size is referred to herein as the typeface rendered size, and is represented by a bounding box around the word.

Figure 4A:
FIGS. 4(a), (b) and (c) are schematic representations of the same word rendered in three candidate typefaces.
Figure 4B:
Figure 4C:

FIGS. 4(*a*), (*b*) and (*c*) illustrate the typeface rendered sizes for the word "to" when different candidate typefaces are applied: 120 point Times New Roman in FIG. 4(*a*); 120 point Helvetica in FIG. 4(*b*); and 120 point Courier New in FIG. 4(*c*). No confidence model need be used because the typeface has a precise height and width, and the typeface rendered size of the word can be calculated accurately. The width x height typeface rendered sizes for the word in FIGS. 4(*a*), (*b*) and (*c*) are respectively: 118×94 pixels; 122×110 pixels; and 168×94 pixels.

At step 32, horizontal and vertical scaling factors are calculated for "fitting" each typeface rendering of the word to the actual size determined at step 20. Since the actual size is represented as a range (i.e., the maximum and minimum plausible values), each scaling factor is also expressed as a range of scaling factors to fit the maximum and minimum plausible sizes.

Figure 5:
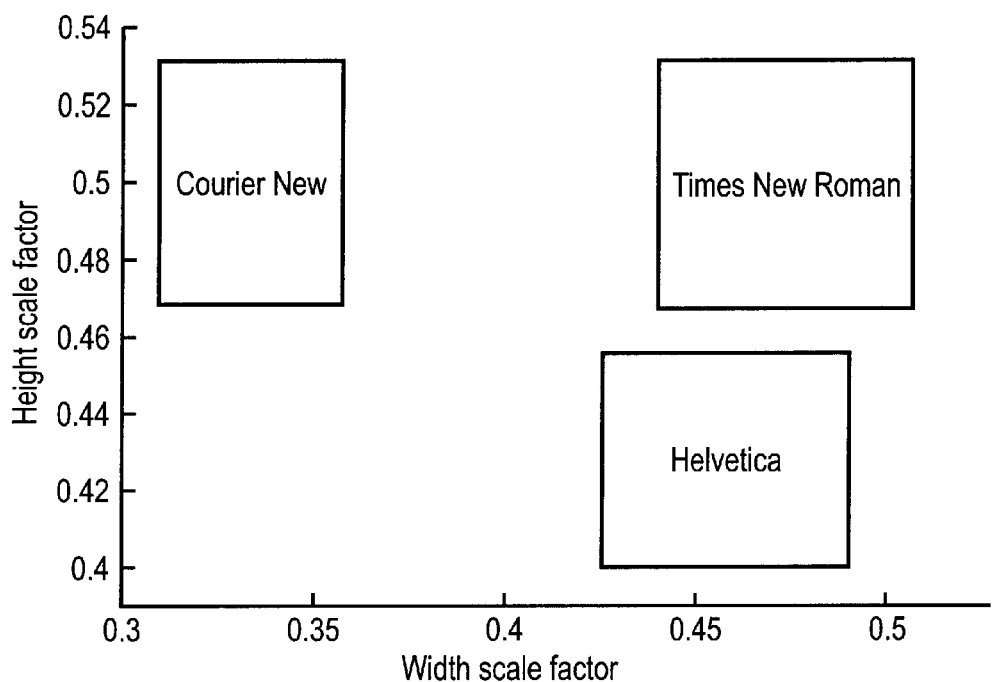
FIG. 5 is a schematic representation of scaling factors for scaling the rendered bounding boxes of FIGS. 4(a), 4(b) and 4(c) to match the size of the bounding box from FIG. 3.

FIG. 5 illustrates graphically the scaling factors calculated for fitting the typeface rendered sizes of FIGS. 4(*a*), (*b*) and (*c*) to the maximum and minimum plausible sizes of FIG. 3. In FIG. 5, the x-axis is the horizontal (width) scale factor, and the y-axis is the vertical (height) scale factor. The calculated scaling factors for the different typefaces are represented as rectangles, whose corners are defined by the horizontal and vertical scaling factors which fit the typeface to the minimum and maximum plausible sizes of the original word. Each rectangle represents a scaling factor "confidence interval" within which the typeface (at that scale) matches the size of the word in the originally scanned image.

The above process is repeated for each word in the defined section of text (typically a paragraph), and the typeface scaling factor "confidence intervals" calculated for each word are stored. It will be appreciated that different words will produce different confidence intervals. However, for the closest matching typeface, the confidence intervals for different words will be relatively tightly clustered together, or have a relatively high coincidence (indicating that roughly the same scaling factor needs to be applied to fit the words in the originally scanned image). In contrast, for a poor fitting typeface, the confidence intervals will be more spread out (indicating that the scaling factor has to be varied from word to word in order to fit the typeface to the word sizes in the originally scanned image).

Figure 6:
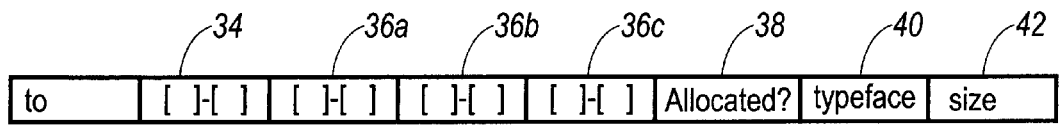
FIG. 6 illustrates a table structure for data for each word.

FIG. 6 illustrates an example table entry structure for stored data for each word in the section of text. The table includes the maximum and minimum plausible sizes 34 of the word in the originally scanned image, a plurality of confidence intervals 36*a*, 36*b*, and 36*c* representing the confidence intervals for the different typefaces, a flag 38 indicating whether the word has yet been allocated a specific typeface, an allocated typeface 40, and an allocated font size (or scaling factor) 42. Initially, prior to the cluster analysis, the flags are set to indicate that no typeface has yet been allocated to the word, and that the word is therefore available in an analysis list awaiting typeface allocation.

Figure 7:
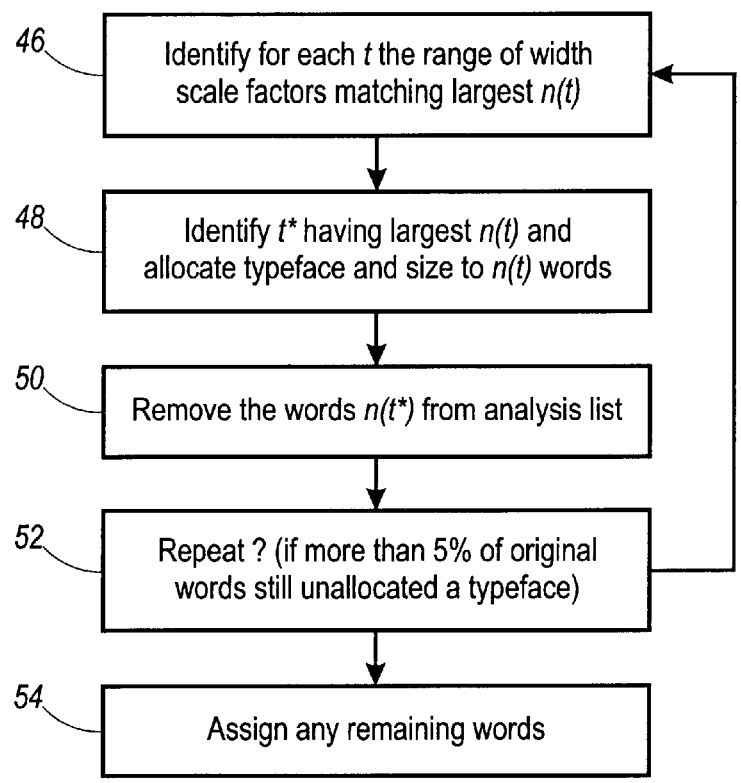
FIG. 7 illustrates a method of cluster analysis for identifying one of more optimum fitting typefaces.

Cluster analysis of the stored data is performed at step 44 (FIG. 5) to identify clusters of scaling factors indicative of the best fit. Referring to FIG. 7, the analysis comprises a first step 46 of identifying, for each typeface t, the range of width scale factors that is contained in the width scale factor confidence interval of the largest number n(t) of words.

At step 48, the typeface t* having the largest n(t) is selected as representing the best fitting typeface for those words n(t), and the allocated typeface is stored in the table field 40 (FIG. 6) for each of the n(t) words. The font size 42 is calculated from the confidence interval for that word (for the allocated typeface). Next, at step 50, those words n(t) for the selected typeface t* are removed from the analysis list, by setting the flag for the word to indicate that the typeface has been allocated.

At step 52, the process is repeated for the remaining words in the analysis list, by returning to step 46 to identify the best fitting typeface for the remaining words. The method repeats until it is detected (at step 52) that the number of words in the analysis list has fallen below a certain threshold (e.g., 5% of the original number of words being analyzed). Once that threshold is reached, the cluster analysis process ends, and proceeds to step 54.

At step 54, any remaining words in the analysis list (i.e., any words to which a typeface has not yet been allocated) are assigned the same typeface as the words closest to them (in reading order), and are scaled to match the size of the word in the originally scanned image.

It will be appreciated that, at step 48, it is possible that the number n(t) may be the same for two different typefaces, indicating that the two typefaces are equally weighted for their particular sets of words n(t). In that case, a preferred typeface is selected on the basis of the previous cycle of the cluster analysis. When this is not possible, the typeface is selected on the basis of the next cycle of the procedure in which there is no tie. In the unlikely event of ties at all stages, a fixed preference order for allocating the typefaces can be used.

The above analysis procedure is merely an example of one technique for identifying clusters, and different techniques may be used as desired. In particular, an agglomerative technique may be used to exploit the idea that neighboring words tend to have the same fonts.

Figure 8:
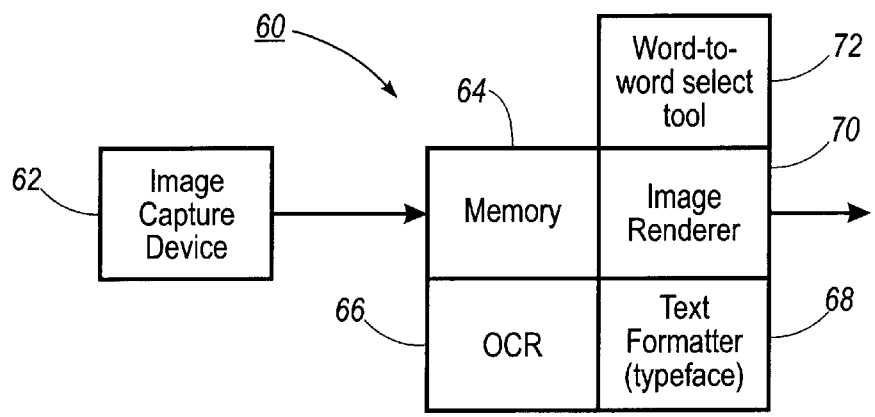
FIG. 8 is a schematic representation of functional components of an OCR display system with a word selection tool.

FIG. 8 illustrates the functional components of a second embodiment of the invention. In FIG. 8, a system 60 is illustrated for processing the output from a document-scanning device 62. The system comprises memory 64 for storing the pixel image from the scanning device 62, an OCR processor 66 for performing OCR on one or more text sections of the image, and a text format processor 68 for identifying the typeface and font size of the text using the OCR text and the originally scanned image. The format processor 68 operates in a similar manner to the first embodiment by calculating the scaling factors required to fit various candidate typefaces to the OCR text on a word-by-word basis, and identifying clusters of such scaling factors indicative of a good fit over several words.

The system further comprises a display generator 70 for generating a display of the scanned image with the text sections replaced by the OCR text formatted using the identified typeface and font size, to produce a matching fit.

Additionally, the system includes a word-to-word selection tool 72 for enabling a user to select portions of the text for copying to an external application program, such as a word-processing program or a publishing program. The word-to-word selection tool 72 operates by selecting portions of the text in units of whole words.

Thus, in this embodiment, a rendered version of the OCR text is displayed in place of the original text portion of the image, and the selection of text using the word-to-word selection tool operates on the OCR text. This can provide the following advantages:

a) The text in a captured image can often appear indistinct and be difficult for a user to read on a screen. Displaying OCR text in its place provides a more easily readable image; and b) By viewing the OCR text, the user can easily identify at an early stage (and in particular before any text is copied) whether any errors have been included in the OCR process, either in terms of the individual character recognition, or in terms of the typeface and font sizes of the text.

Although in FIG. 8 the functional components of the system 60 are shown as separate units, it will be appreciated that one or more of the components may be implemented by executable software.

It will be appreciated that the invention, particularly as described in the preferred embodiments can provide significant advantages over conventional character-by-character based techniques for determining a typeface and a font size to format OCR text. Although the invention is not limited to use with a selection tool (e.g., a word-to-word selection tool), this is a powerful combination which enables a user to work on a scanned image of a document which is in fact an OCR processed image.

It will be appreciated that the forgoing description is merely illustrative of preferred embodiments of the invention, and that many modifications and equivalents will occur to one skilled in the art with the scope and spirit of the invention.

What is claimed is:

1. A method of determining a typeface for a plurality of words derived from a scanned image of text, the method comprising:

providing a plurality of candidate typefaces;

calculating for each typeface and for each word a scaling factor to match a typeface rendering of the word to the size of the word in the scanned image; and analyzing the calculated scaling factors to identify a typeface which matches a plurality of the words;

wherein said analyzing the scaling factors comprises identifying one or more clusters of the scaling factors indicative of a good fit of the typeface to a plurality of the words.

2. A method according to claim 1, wherein the scaling factor comprises a width component and a height component.

3. A method according to claim 1, wherein the size of the word in the scanned image is represented as a range of possible sizes between a minimum plausible size and a maximum plausible size.

4. A method according to claim 3, wherein the step of calculating a scaling factor comprises calculating a scaling factor range for fitting the typeface rendering of the word to said minimum and maximum plausible sizes of the word in the scanned image.

5. A method according to claim 1, wherein the size of the word in the scanned image is represented as the dimensions of a bounding box around the word.

6. A method according to claim 1, further comprising the step of determining the size of each word in the scanned image.

7. A method according to claim 1, wherein the step of analyzing the scaling factors comprises a first step of identifying for each typeface one or more optimum scaling factors which fit the largest number of words for that typeface.

8. A method according to claim 7, wherein the one or more optimum scaling factors form a range of optimum scaling factors.

9. A method according to claim 7, wherein the step of analyzing the scaling factors further comprises a second step of selecting the typeface having the largest number of words to which the optimum scaling factor frtted the typeface in the first step.

10. A method according to claim 9, further comprising allocating the selected typeface to the words to which the typeface fits with the optimum scaling factor, and repeating the first and second steps for other words to which no typeface has been allocated.

11. A method according to claim 1, further comprising:
determining for each word derived from the scanned image of text a maximum plausible bounding box size and a minimum plausible bounding box size;
determining for each typeface rendering of each word a bounding box size; and
wherein each calculated scaling factor is a range of possible scaling factors which fit each typeface rendering bounding box size within the maximum plausible bounding box size and the minimum plausible bounding box size of each word from the scanned image.

12. A computer program stored in a computer readable medium which when executed on a computer implements a method of determining a typeface for a plurality of words derived from a scanned image of text, the method comprising:
providing a plurality of candidate typefaces;
calculating for each typeface and for each word a scaling factor to match a typeface rendering of the word to the size of the word in the scanned image; and
analyzing the calculated scaling factors to identify a typeface which matches a plurality of the words;
wherein said analyzing comprises identifying one or more clusters of scaling factors for a typeface indicative of a good fit of the typeface to a plurality of the words.

13. A computer program according to claim 12, wherein the method further comprises:
determining for each word derived from the scanned image of text a maximum plausible bounding box size and a minimum plausible bounding box size;
determining for each typeface rendering of each word a bounding box size; and
wherein each calculated scaling factor is a range of possible scaling factors and
which fit each typeface rendering bounding box size within the maximum plausible bounding box size and the minimum plausible bounding box size of each word from the scanned image.

14. A system for determining a typeface for a plurality of words derived from a scanned image of text, the system comprising:
an image analyzer for identifying the original size of each word in the scanned image;
a typeface processing device for calculating for each of a plurality of candidate typefaces and for each word, a scaling factor to match a typeface rendering of the word to said original size of the word in the scanned image; and
a cluster processor device for identifying one or more clusters of scaling factors for a typeface indicative of a good fit of the typeface to a plurality of the words.

15. A system according to claim 14, further comprising a typeface allocator for allocating a typeface to a word on the basis of the identified clusters.

16. A system according to claim 14, further comprising an optical character recognition processor for performing optical character recognition for deriving said words from the scanned image.

17. A system according to claim 14, further comprising a display generator for generating a display including the derived words rendered using the allocated typeface for each word.

18. A system according to claim 14, wherein the display generator is operative to generate a first display region including said words rendered using the allocated typeface, and a second region including a non-text region of the scanned image.

19. A system according to claim 18, further comprising a word based selection tool for enabling selection of one or more words from the first display region.

20. A system according to claim 14, wherein:
the image analyzer identifies for the original size of each word derived from the scanned image of text a maximum plausible bounding box size and a minimum plausible bounding box size; and
the typeface processing device determines for each typeface rendering of each word a bounding box size and calculates for each calculated scaling factor a range of possible scaling factors which fit each typeface rendering bounding box size within the maximum plausible bounding box size and the minimum plausible bounding box size of each word from the scanned image.

* * * * *